Figure 1:
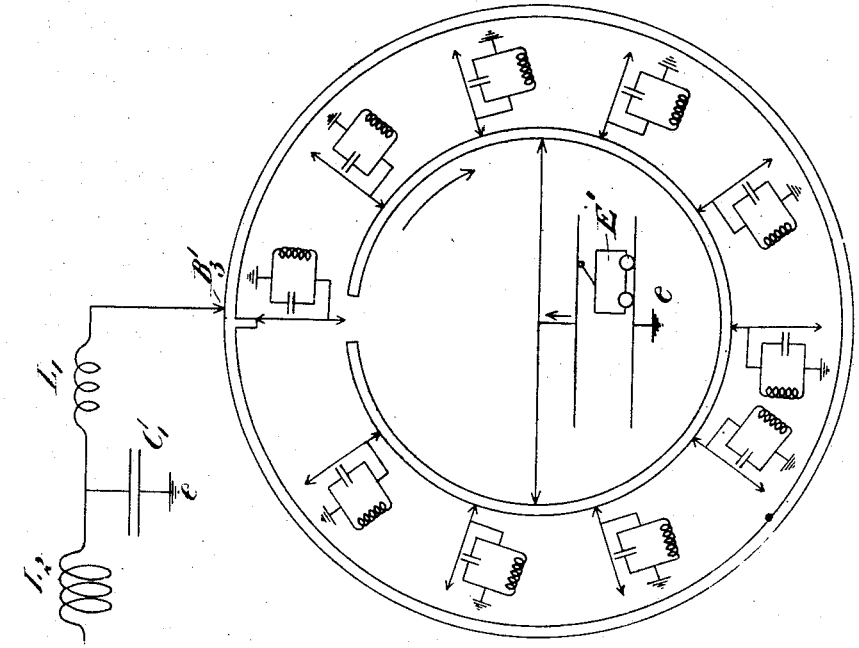
Figure 1:
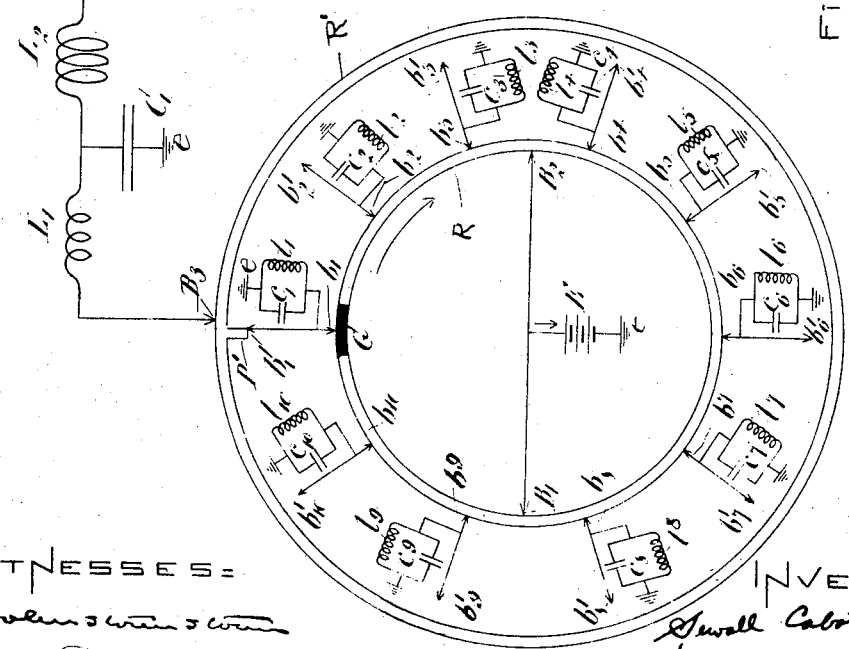

S. CABOT.
ELECTRIC CONVERSION.
APPLICATION FILED DEC. 4, 1909.

1,081,090.

Patented Dec. 9, 1913.
3 SHEETS—SHEET 1.

WITNESSES:
INVENTOR:
Sewall Cabot
by Browne & Woodworth
attys.

S. CABOT.
ELECTRIC CONVERSION.
APPLICATION FILED DEC. 4, 1909

1,081,090.

Patented Dec. 9, 1913.

3 SHEETS—SHEET 3.

WITNESSES:
INVENTOR:
Sewall Cabot
by Browne & Woodworth
Attys.

UNITED STATES PATENT OFFICE.

SEWALL CABOT, OF BROOKLINE, MASSACHUSETTS.

ELECTRIC CONVERSION.

1,081,090.  Specification of Letters Patent.  Patented Dec. 9, 1913.

Application filed December 4, 1909.  Serial No. 531,306.

*To all whom it may concern:*

Be it known that I, SEWALL CABOT, a citizen of the United States, and a resident of Brookline, in the county of Norfolk and State of Massachusetts, have invented a new and useful Improvement in Electric Conversion, of which the following is a specification.

My invention relates, in general, to the conversion of electric current having certain characteristics into electric current having different characteristics, and specifically, to the conversion of low-potential direct or alternating current to high-potential direct current, and vice versa, and it may be used, among other things, to improve the efficiency of power transmission in the manner hereinafter more fully set forth.

Heretofore practically all electrical power has been transmitted by low-potential direct or alternating currents or by high-potential alternating current. The advantages of high-potential transmission are well known and require no discussion herein; but so far as I am aware, practically all such high-potential transmission is limited to alternating currents because it has been found impracticable to develop direct currents having the high tension necessary to secure such advantages.

The advantages arising from high-potential direct current transmission are numerous. For instance the copper losses due to the line charging currents and the losses due to dielectric hysteresis are rendered negligible; the line may be introduced into an underground conduit because the increased electrostatic capacity of such underground line or cable, instead of causing a prohibitory loss, as is the case where alternating current is employed, actually improves the transmission; all harmful, inductive disturbances in telephone and telegraph lines may be obviated; the transmission line may consist of one wire with ground return instead of two or three wires without ground returns; no electromagnetic rotary converter is required at the distributing station to transform the energy to a form suitable for general use, thereby obviating the losses incidental to such conversion, which are considerable owing to the relatively low efficiency of such converters, etc.

My invention, broadly speaking, comprises an apparatus for transforming low constant-potential direct current or alternating current to high-potential direct current, as well as an apparatus for converting said high-potential direct current into low-potential direct current or alternating current. The energy may be transmitted on a constant potential or a constant current basis.

I shall describe my invention with reference to the drawings which accompany and form a part of this specification and which represent in diagram several arrangements of apparatus and circuits whereby my object can be effected.

Figure 2:
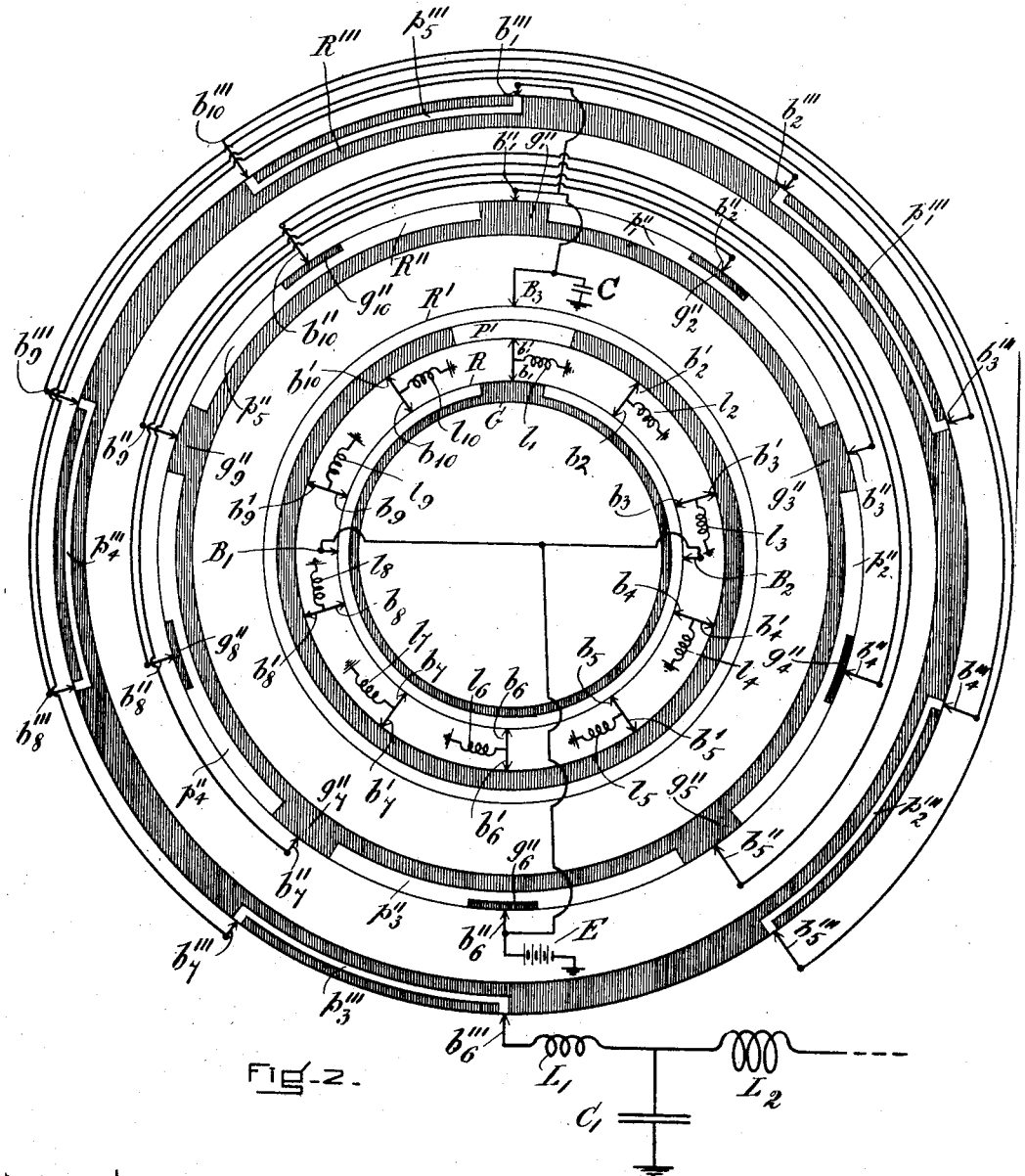
Figure 3:
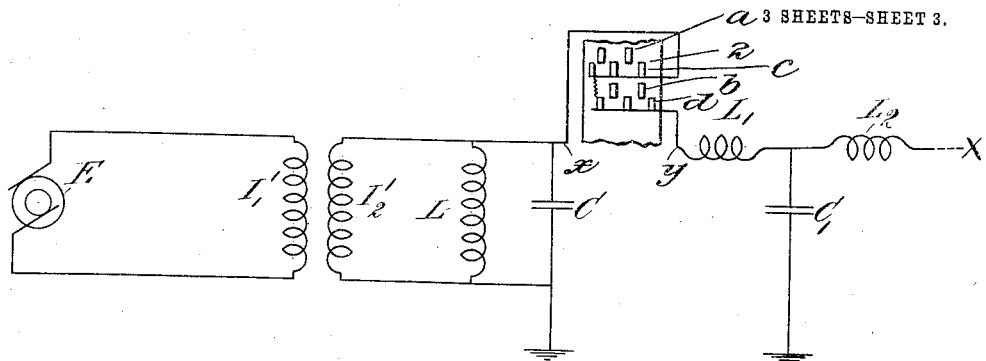
Figure 4:
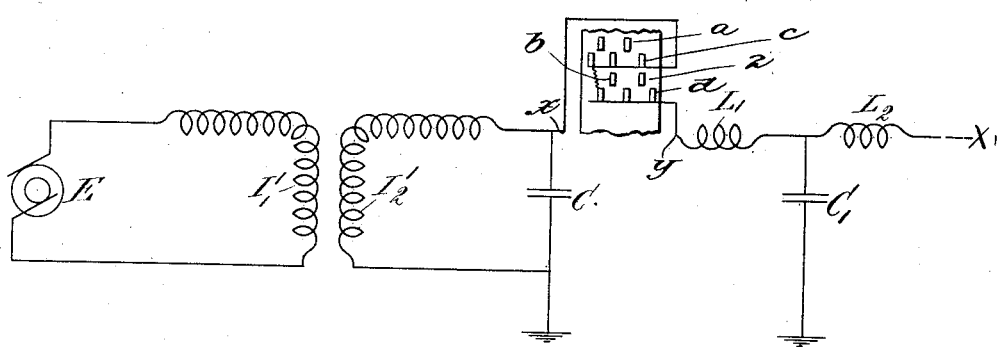
Figure 5:
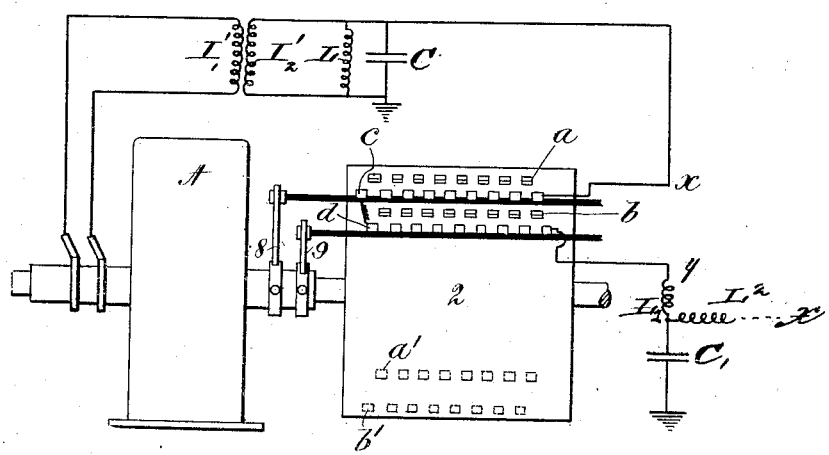

In the drawings, Figure 1 shows in diagram one embodiment of my invention arranged for a low-potential direct current source, Fig. 2 is a diagram showing a modification of the system illustrated in Fig. 1; Fig. 3 is a diagram showing one embodiment of my invention arranged for a low-potential alternating current source; Fig. 4 is a diagram showing a modification of the arrangement illustrated in Fig. 3. Fig. 5 shows a detail of construction.

In Fig. 1, X represents a transmission line connecting two terminal stations each provided with an apparatus capable of transforming low constant-potential direct current to high constant-potential direct current or vice versa. The station at the left-hand side of the drawing is the transmitting station connected to a prime source of energy E, conventionally shown as a battery although it will be understood of course that any suitable source may be used. The station at the right-hand side of the drawing is a distributing station connected with the energy consuming device E' herein conventionally shown as a trolley car.

The concentric rings R R' of conducting material are mounted on a suitable device to rotate in a clockwise direction, as indicated by the arrow, at a speed which may be about 1800 revolutions per minute when the diameter of the outer ring is about four feet, although it will be understood that I do not limit myself to these values.

The circuits, each of which includes one of the "transfer" condensers $c_1 \ldots c_{10}$ and one of the coils $l_1 \ldots l_{10}$, i. e., the circuits $c_1 l_1$, $c_2 l_2$, etc., are oscillating circuits and each is connected as shown to the earth $e$ and to a conductor which connects one of the pairs of brushes $b_1 \, b'_1 \ldots b_{10} \, b'_{10}$.

The brushes $b_1$, etc., are arranged to contact with the inner ring R which is provided with an insulating gap G. The brushes $b'_1$, etc., are arranged to contact successively with the projection P' of the ring R'. The source E is connected to earth $e$ at one terminal and to the ring R at the other terminal by the brushes $B_1 \, B_2$, two such brushes being employed so that said source will always be connected to the ring R.

The brush $B^3$ contacts with the outer ring R' and is in turn connected with the line X through the interposition of an inductance coil $L_1$. A condenser $C_1$, which I call a "storage" condenser and which preferably has a much larger capacity than the condensers $c_1$, etc., may be connected between the earth $e$ and the outer terminal of the coil $L_1$, and a second coil $L_2$ may be connected between the juncture of $L_1$, $C_1$ and the line X. The arrangements of coils, condensers and brushes connecting the line X with the distributing station may, as shown, be identical with that performing the similar function at the generating station.

Assuming that the rings R R' are rotating in a clockwise direction as shown, the current from the source E will flow through the coils $l_1$, etc., of each of the oscillating circuits $c_1 \, l_1$, etc., that is in contact with the ring R, such current flowing from the source E to the earth $e$, thence through the earth connections of said circuits, through the coils in question to the brushes $b_1$, etc., and thence back to the source by way of one of the brushes $B_1 \, B_2$. Thereby a magnetic field is established in the coil $l_1$, but the electrical energy in the charge which the condenser $c_1$ takes is so small as to be negligible. The energy is almost entirely kinetic while the brush $b_1$ is in contact with the ring R. When this circuit is broken by the insulation G, objectionable sparking does not take place because the condenser $c_1$ shunts the terminals of the inductance $l_1$. Any tendency to spark may be reduced to a minimum by the serial switch shown in Fig. 2. As soon as the ring R breaks connection with one of the brushes $b_1$ etc., the magnetic field in the coil $l_1$ collapses and the circuit $c_1 \, l_1$ begins to oscillate. I so design and proportion the coils $l_1$, etc., and the condensers $c_1$, etc., that with the predetermined speed of the rings R, R' and the length of the gap G and the relative position of the projection P' on the ring R', the charge in the condenser $c_1$ reaches the maximum, and the energy in the oscillation circuit $c_1 \, l_1$ is substantially all static or in the condenser, at the instant when the brush $b'_1$ makes contact with the projection P'. When the projection P' contacts the brush $b'_1$, etc., assuming the device to be acting as a transmitter, some portion of the charge in the transfer condenser is transferred to the storage condenser $C_1$, provided the potential to which the condenser $c_1$, etc., is charged is greater than that of the storage condenser. To obtain the maximum transfer of energy from the condenser $c_1$ to the storage condenser the angular extent of the contact face of the projection P' must have a length so related to the speed of the ring R' that the brush $b'_1$ remains in contact with the projection P' for an interval of time approximately equal to one-half the time period of the circuit serially including the condenser $c_1$, etc., the coil $L_1$ and the condenser $C_1$, i. e., the circuit $e \, c_1 \, L_1 \, C_1 \, e$.

When the projection P' contacts with the brush $b'_1$, the energy of the oscillating circuit $e \, c_1 \, L_1 \, C_1 \, e$ is all in static form. At the middle of the half cycle of the oscillation executed when said brush contacts with said projection, in other words, at the end of the quarter period of the circuit $e \, c_1 \, L_1 \, C_1 \, e$, a certain quantity of electricity has passed between $c_1$ and $C_1$. This transfer of electricity has however established a magnetic field in the coil $L_1$ and this field will therefore continue the transfer of electricity between $c_1$ and $C_1$ in the same direction until the end of said half-cycle when the current in said coil becomes zero and the energy of said circuit $e \, c_1 \, L_1 \, C_1 \, e$ is entirely static so that there has been established between the two condensers a difference in potential opposite in sign and substantially equal to the difference in potential between the two condensers at the beginning of the half cycle or at the instant of time that the projection P' contacted with the brush $b'_1$. The energy of the oscillating circuit which includes the condenser $C_1$, i. e., the circuit $e \, c_1 \, L_1 \, C_1 \, e$, is now all static and the current in the circuit is at a minimum. If the apparatus is perfectly timed, it is at zero at the instant the projection P' breaks with the brush $b'_1$. This is important because the potential of the current in the circuit $e \, c_1 \, L_1 \, C_1 \, e$ is high, and by breaking the circuit at the instant of zero or minimum current, I avoid sparking and consequent injurious wear and deterioration of the brushes $b'_1$, etc., and the contact P'. The potential of the condenser $c_1$, etc., is now substantially as much below that of the condenser $C_1$ as it was above it at the instant the projection P' made contact with the brush $b'_1$ or vice versa, if the device is acting as a receiver. Further rotation of the rings R R' will bring the brush $b_1$ again in contact with the inner ring R, so that the current from the source E will again flow through the coil $l_1$, and the several oscillating circuits $c_2 \, l_2$, $c_3 \, l_3$, etc., will successively transfer their energy to the line or working circuit which includes the condenser $C_1$.

The amount of power transmitted by the system will depend among other things upon the number of oscillation circuits $c_1$ $l_1$, etc., the speed of rotation of the rings R R', the voltage of the prime source of energy E, etc. A portion of the energy stored in the condenser $C_1$ is transferred over the line as high constant-potential direct current to the energy-distributing station, the inductance or inductances $L_2$ being employed if desired to assist in maintaining the potential constant. The coils $L_2$ are made to have a very large inductance compared to the coils $L_1$ when the conditions are such that the connection of the transmission line to the storage condenser $C_1$ would otherwise modify the period of natural oscillation of the circuit $e$ $C_1$ $L_1$ $c_1$ $e$. The energy so transferred to the storage condenser $C_1$ at the distributing station is delivered to the consuming circuit as low tension direct current by operations exactly the reverse of those already described in a manner that will be obvious.

If a transfer condenser $c_1$ does not discharge all of its energy into a storage condenser $C_1$ during the half oscillation of the circuit $e$ $c_1$ $L_1$ $C_1$ $e$, it will establish a current in the coil $l_1$ opposite in sign to the current originally flowing through the coil from the source E. The energy in the form of current in the coil $l_1$ at the end of a half oscillation of the circuit $c_1$ $l_1$ is substantially equal to the energy in said coil at the instant of its disconnection from said source E less the energy transferred to the condenser $C_1$. Upon the reconnection of the brush $b_1$ with the ring R, the energy in the form of current in said coil $l_1$ will flow back to the low potential source E. When said electrical energy has been so restored to said source E, the current in said coil $l_1$ becomes zero and the source E commences to establish a second current in the coil $l_1$, which gradually increases, its value depending upon the length of time the said coil is connected to said source,—in other words, upon the time the brush $b_1$ is in contact with the ring R. I prefer to adjust the duration of such contact so that the value of the current in the coil $l_1$ at the instant of disconnection of said circuit $c_1$ $l_1$, from the source E is equal in value and opposite in direction to the current in said coil at the instant of reconnection of said circuit with said source if no energy had been transferred to the condenser $C_1$. Unless energy is being drawn from the line X, there can be no transfer of energy from a transfer condenser $c_1$ to the storage condenser $C_1$, and we would then have the no load condition.

The apparatus above described constitutes a system of step-up or step-down transformation of direct currents on a constant potential basis.

If the system is transmitting electrical energy at its maximum efficiency, the aforesaid charge remaining in the transfer condenser $c_1$ will be zero and the current in said coil $l_1$ at the instant of disconnecting said circuit $c_1$ $l_1$ from the source will be slightly less than twice the no-load current at this instant. The voltage of the transfer condenser caused by this current will be slightly less than twice the no-load voltage. The voltage of the storage condenser when half the charge has been transferred will be exactly half said voltage of said transfer condenser so caused by said current as aforesaid, or only slightly less than the no-load voltage.

The cycle consisting of the connection of the circuit $c_1$ $l_1$, etc., with the source E, the isolation thereof from said source, the resulting development of one-half an oscillation therein, the transference of a portion or the whole of the energy of said circuit to the storage condenser, the breaking of the circuit including the storage condenser at the end of one-half an oscillation in the circuit $c_1$ $L_1$ $C_1$ when the current therein is at zero or a minimum and the re-connection of said circuit $c_1$ $l_1$ with said source at the end of one-half the time period of said circuit,—constitutes a stable cycle which will occur indefinitely. A similar device may be employed to transform the energy at the receiving station into low potential energy. The two storage condensers $C_1$ $C_1$ are connected by a transmission line using a ground return. Under the above described cycle, the instant the transfer condenser at the receiving station is connected to the storage condenser at said station, its potential is reduced and may become zero, because said transfer condenser is the transmitter at such instant of connection. The current which becomes established in one of the coils by the time it is closed on the low potential circuit which includes the energy-consuming device E' is equal to the current in a coil $l_1$ at the transmitting station at the instant of disconnection of the circuit $c_1$ $l_1$ from the source E. The current in a coil $l_1$ on disconnection at the distributing station will correspond in a similar manner to the current in a coil $l_1$ on reconnection at the transmitting station.

The test to show whether or not any step-up transformer is on a true constant potential basis is that if the high potential terminals be short-circuited, the current in the supply circuit shall be limited only by the resistance therein. It will be seen that the present system follows this rule because, if the storage condenser $C_1$ is short-circuited, the voltage of the transfer condenser $c_1$ will be simply reversed in direction without being appreciably altered in magnitude during the time it is connected to said short-circuited storage condenser by the brush $b_1'$. This will cause the current in the coil $l_1$ at the instant of re-connection of the circuit $c_1$ $l_1$ to the low potential source E to have the same direction of flow, as well as the same magnitude, as at the instant of the dis-connection of said circuit from said source by the gap G. Under these circumstances, the value of current in a coil $l_1$, etc., will constantly increase until it reaches a magnitude which is governed only by the ohmic resistance thereof.

For the purpose of more fully disclosing my invention, I shall give the constants of one embodiment thereof whereby a high efficiency of constant-potential transmission may be effected; but I desire it to be distinctly understood that I do not limit myself to this specific example.

In using my system for the transmission of large amounts of electrical energy of the order of one thousand kilowatts, I may, largely for mechanical reasons, design the coils $l_1 \ldots l_{10}$ to have a time constant L/R of about unity, L being the inductance of each coil in henries and R being the resistance thereof in ohms. This constant determines the size of the coil, and an air-cored coil having such time constant may have, approximately, an outside diameter of six feet and comprise a square channel about sixteen inches on a side filled with turns. If the value of 1/LC is taken as $10^7$, where L is the inductance of each of the coils $l_1 \ldots l_{10}$ and C is the capacity of each of the condensers $c_1 \ldots c_{10}$, the time required for one complete transformation of the energy of one of the circuits $c_1$ $l_1 \ldots c_{10}$ $l_{10}$ from kinetic energy to static energy or vice versa may be obtained without appreciable error by the formula:

$$T_1 = \frac{\pi \sqrt{LC}}{2}$$

where $T_1$ is one quarter of the time period of each of said circuits and is equal in the present example to about .0005 second. Accordingly I prefer to make the gap G of such length that the time during which one of the brushes $b_1 \ldots b_{10}$ is out of contact with the ring R is equal to $2T_1$. At an instant almost $T_1$ seconds after one of the brushes $b_1$ has broken connection with the ring R, the energy in the corresponding oscillating circuit $c_1$ $l_1$, etc., is almost entirely static and at this instant the projection P' makes contact with one of the brushes $b_1'$, whereupon the transfer of the energy of one of the transfer condensers $c_1$, etc., to or from the storage condenser $C_1$ begins. Such transfer of energy takes place while the connection between one of the brushes $b_1'$, and the projection P' is kept closed for a time obtained by the formula $$2T_2 = \pi \sqrt{L_1 \frac{CC_1}{C + C_1}},$$

where $T_2$ is one-quarter of the time period of the oscillating circuit $e$ $c_1$, etc., $L_1$ $C_1$ $e$; $L_1$ is the inductance of the coil $L_1$ in henries; C is the capacity of one of the condensers $c_1$, etc., and $C_1$ is the capacity of the condenser $C_1$, in farads. Accordingly I prefer in the present example to so position and proportion the projection P' that $T_2$ is equal to $.1T_1$ and this can be conveniently effected by adjusting the period of circuit $e$ $c_1$ $L_1$ $C_1$ $e$ by so changing the inductance of the coil $L_1$ as to insure that the energy transfer from one of the condensers $c_1$, etc., to the condenser $C_1$ shall begin at an instant of time when there is practically no energy in the coil $l_1$, etc. As indicated in the drawing, the projection P' is midway between the ends of the gap G. It will be noted that the time $2T_2$ during which a brush $b_1'$, remains in contact with P' is equal to the duration of a half-cycle of electrical oscillation of the second oscillatory circuit formed when the projection P' contacts one of the brushes $b_1'$, etc., viz., the circuit which includes $c_1$, etc., $L_1$ $C_1$. In the above example, $C = 2 \times 10^{-6}$ farads, $L = .05$ henry, $C_1 = 2 \times 10^{-5}$ farads, $L_1 = .00055$ henry.

If T represents the length of time one of the circuits $c_1$ $l_1$, etc., is in contact with the ring R, and $I_1$ represents the current in one of the coils $l_1$, etc., at the instant such circuit breaks connection with said ring, then the kinetic energy in the coil at the instant of such break is equal to one-half $L$ $I_1^2$ joules. At the time $$T_1 = \frac{\pi \sqrt{LC}}{2}$$

second after such circuit has broken its connection with said ring the kinetic energy will have been transformed into static energy and we may write $1/2LI_1^2 = 1/2CV^2$ approximately, where V is the maximum potential to which one of the condensers $c_1$, etc., is charged. The energy is now all stored in the condenser and the current-flow in the coil $l_1$ is zero. The potential of the condenser will therefore be $$I_1 \sqrt{\frac{L}{C}}$$

volts at this instant. At an instant $$\pi \sqrt{CL}$$

second after said circuit has broken its connection with the ring R, the condenser $c_1$, etc., (assuming the no load-condition) will have completely discharged through the coil $l_1$, etc., establishing a current I substantially equal to $I_1$ and flowing therethrough in a direction opposite to that in which the current from the source E originally flowed, the potential of the condenser at this time being zero. At this instant the circuit $c_1 l_1$, etc., is again closed on the ring R by the brush $b_1$, etc., the gap G being so proportioned, as above stated, that the brush is disconnected from said ring R for an interval of time $$2T_1 = \pi\sqrt{CL}.$$

The current in the coil $l_1$, etc., now flows back against the impressed electromotive force E until it has restored $1/2 LI^2$ joules to the low potential source whereupon the current in the coil $l_1$, etc., reverses in direction and the source E begins to establish in such coil a new current which stores therein a certain amount of kinetic energy.

If the time T during which a coil $l_1$, etc., remains closed on the ring R is adjusted so that the value of current established at the end of this time T is equal in value and opposite in direction to the current caused to flow in such coil by the discharge of one of the condensers $c_1$, etc., a stable condition is established whereby all the energy taken from the source is returned to it provided the condensers $c_1$, etc., are allowed to discharge only through their respective coils $l_1$, etc., as when the contact P′ is removed or when no energy is being drawn from the line, i. e., during the no-load condition. The equation giving the value of the current at the end of time T in a coil $l_1$, etc., closed on a constant-potential source E and having current flowing in a direction opposite to that of current from the source at the moment of closure is—

$$I_1 = I\varepsilon^{-\frac{RT}{L}} - \frac{E}{R}\left(1 - \varepsilon^{-\frac{RT}{L}}\right)$$

where $I_1$ represents the current established in said coil by said source at the end of time T, I represents the current flowing in said coil in a direction opposite to that of the current of said source at the beginning of the time T, L represents the inductance of the coil in henries, R represents the resistance of the coil in ohms, T represents the time in seconds that the coil is connected with the source, and E represents the voltage of the source. From this equation we have $$T = \frac{L}{R} 2.3 \log_{10}\left(\frac{\frac{E}{RI}+1}{\frac{E}{RI}-1}\right)$$

when $I_1 = I = I_0$ from which the length of the ring R can be determined for any given speed of rotation.

The cycle above described will occur indefinitely provided the condenser $c_1$, etc., can discharge only through the coil $l_1$, etc., and it may be taken as the no-load cycle of a constant-potential power transmission system whose ratio of transformation is $$\frac{E}{I_0\sqrt{\frac{L}{C}}}$$

The condition for full load, may be considered, if so desired, as:—at the transmitter—

$$I_1 = \frac{E}{R}\left(1 - \varepsilon^{-\frac{RT}{L}}\right)$$

and $I = 0$; and the corresponding condition at the receiver, as:—

$$I = \frac{E}{R}\left(1 - \varepsilon^{-\frac{RT}{L}}\right)$$

and $I_1 = 0$. A mathematical analysis of the problem at this condition indicates that the line voltage is substantially equal to the no-load line voltage multiplied by $$\left(1 - 1/2\frac{RT}{L}\right),$$

where $$\frac{RT}{L} < .1.$$

The analysis also indicates that the low voltage at the receiving end is substantially equal to E multiplied by $$\left(1 - \frac{RT}{L}\right)$$

under the same conditions and the efficiency as a whole is equal to $$100\left(1 - \frac{RT}{L}\right)\%.$$

In putting my invention into practice I may use values of the order of T = .01 second giving with a time constant of 1 second an efficiency of 99%.

It will be noted that the system when operating in this condition is substantially the same as that described by me in pages 3, 4 and 5 of United States Patent No. 917,749, April 3, 1909 and that the equations there stated may be used in calculating various data regarding this condition.

It is obvious that the length of time T during which one of the brushes $b_1$ is in contact with the ring R should be long compared to $$2T_1 = \pi\sqrt{LC},$$

and this permits the simultaneous charging of a large number of separate inductances $l_1$, etc., by the source E and the successive discharges of the condensers $c_1$, etc., into the storage condenser C. The amount of power transmitted by the system will then increase proportionately to the number of coils $l_1$, etc., employed, provided that such coils are employed within the limits above set forth.

In order to change the system from one which transforms unidirectional low constant-potential electrical energy to unidirectional high constant-potential energy, on the one hand, to one which transforms a unidirectional low constant-potential electrical energy to unidirectional constant-current electrical energy, on the other hand, it suffices merely to retard the instant of closure of the brush $b_1$, etc., with the ring R by a time equal to $$2T_1 = \pi\sqrt{LC},$$

in other words, to so design the gap G that the brush $b_1$ is out of contact with the ring R for $4T_1$ second. This may be accomplished by doubling the length of said gap. The storage condenser $C_1$ may be of the aluminum film type since, if its capacity is large compared to $c_1$, etc., its voltage fluctuation is very slight.

In putting this system into operation, in order to prevent sparking at the commutator when the circuit to the source is opened by the insulating gap G passing under brushes $b_1 \ldots b_{10}$, it will be necessary to use a sufficient peripheral velocity to cause the disruptive strength in volts of the gap between R and $b_1 \ldots b_{10}$ at any instant of time to be greater than the value of the voltage at that same instant of time on the terminals of condensers $c_1 \ldots c_{10}$. It will also be necessary to keep short the length of the disruptive discharge which must occur when the projection P' comes into close proximity with the brushes $b'_1 \ldots b'_{10}$. This length of disruptive discharge must be small compared to the length of the projection P'. In order to fulfil these conditions, in some cases the peripheral velocity of the commutator would reach a magnitude which would be inconvenient in point of view of mechanical considerations.

In U. S. Patent #917,749, April 13, 1909, I have fully described a device which obviates the necessity of resorting to high peripheral velocities to fulfil these conditions. The principle of its operation is, broadly speaking, the opening and closing of a circuit by simultaneously introducing into it and shunting out a large number of small gaps in series. One of the many ways in which this device may be made use of in connection with the device shown in Fig. 1 is shown in Fig. 2.

In Fig. 2, R R' R'' R''' are four commutator rings all revolving at the same angular velocity and stationary with respect to themselves. $l_1 \ldots l_{10}$ are the same inductances as shown in Fig. 1. They are connected to the source of low potential E through brushes $b_1 \ldots b_{10}$, collector ring R and brushes $B_1$ or $B_2$. I make the angle subtended by the gap G slightly greater than an angle corresponding to the time $2T_1$. I make the diameter of R sufficient to prevent any danger of disruptive discharge occurring between any brush $b_1 \ldots b_{10}$ and ring R when said brush is on gap G. R' is a second collector ring continually in contact with brush $B_3$. It carries the segment P' which comes in contact successively with brushes $b_1' \ldots b_{10}'$. I make the angle subtended by the segment P' slightly greater than the angle subtended by gap G and I make the diameter of R' sufficient to prevent any danger of disruptive discharge occurring between P' and any brush $b_1' \ldots b_{10}'$, not in contact with P'. This arrangement makes it possible to do away with condensers $c_1 \ldots c_{10}$ shown in Fig. 1 and replace them by a single condenser C connected with the brush $B_3$ and preferably employing compressed air for a dielectric.

R'' is a commutator composed of insulating segments $g_1'' \ldots g_{10}''$ and conducting segments $p_1'' \ldots p_5''$. Ten brushes $b_1'' \ldots b_{10}''$ are distributed at equal intervals around the circumference and connected in the manner shown. It is on this ring that the circuit to the source of low potential E of any coil $l_1 \ldots l_{10}$ which is in contact with P' is actually opened and closed. The angle subtended by any gap $g_1'' \ldots g_{10}''$ is made to give a time equal to $2T_1$, and 360° minus this angle, a time equal to T when the angular velocity of rotation has the correct specified value. It will be noted that the circuit is opened or closed at ten places simultaneously in passing from $b_1''$ through brushes $b_2'', b_3'', b_4'', b_5'', b_7'', b_8'', b_9'', b_{10}''$ and conducting segments $p_1'' \ldots p_5''$ to brush $b_6''$. I make the diameter of the ring R'' sufficient to prevent sparking occurring at the moment of interruption. Data for calculating this diameter may be had by reference to my aforementioned U. S. patent.

R''' is a commutator composed in a similar manner to R'' and governs transfer of energy between the storage condenser $C_1$ and the transfer condenser C by closing and opening the circuit at ten series points simultaneously through brushes $b_1'''$ brushes $b_2''', b_3''', b_4''', b_5''', b_7''', b_8''', b_9''', b_{10}'''$, conducting segments $p_1''' \ldots p_5'''$ brush $b_6'''$ and inductance $L_1$. The angle subtended by the part of the metal segment $p_1''' \ldots p_5'''$ which is exposed to contact with the brushes is made to correspond with the time $2T_2$ at the specified angular velocity of rotation.

The position shown in Fig. 2 of the revolving members R R' R'' and R''' with respect to the brushes corresponds to that part of the cycle when one half of the quantity of electricity transferred has passed between C and C$_1$. It will be seen that the underlying electrical principle on which the proper operation of the system depends is the use of the half period of a circuit having a natural period to transfer a maximum of energy from one condenser to another. By a slight modification shown in Fig. 3, I may apply this principle to the conversion of low potential alternating current to high potential direct current.

In Fig. 3, E is a source of low potential alternating current. I$_1'$ and I$_2'$ are the low and high potential windings respectively of a constant potential type of commercial alternating current transformer and C L$_1$ C$_1$ L$_2$ X is the same circuit previously described. At the points $x$ $y$ is inserted the rotary serially subdivided switch shown in Fig. 1 of my aforementioned patent and shown in skeleton in Fig. 5 of the present case. In Fig. 5 the generator or synchronous motor A is assumed to be a four pole machine giving one revolution for each two cycles and constitutes, or is operated by, the source E. Under these conditions the circuit between the points $x$ and $y$ is closed once per cycle. I make the duration of this closure equal to 2T$_2$ previously described herein by proportioning the length of members $a$ $b$ and $a'$ $b'$, and I cause this closure to take place at the moment the potential of condenser C is at a maximum or nearly a maximum, by adjusting the rocker arms 8, 9, with respect to the rotor 2, and thereby the oscillating circuit is broken, as in the case of the apparatus shown in Figs. 1 and 2, at the instant when the current at the point of disconnection is at zero or at a minimum. I adjust the natural period of the circuit L C to be equal to the period of the alternating current source. Under these conditions the direction of the electromotive force on the condenser C at the instant of closure will always be the same, and at the no-load condition will be equal to 2 times the rated voltage on the high potential side of the transformer. Should the potential of the storage condenser C$_1$ fall below this value, energy will be transferred to it from condenser C in the manner described herein. Should the potential of the storage condenser remain at such value as is the condition of no-load, no energy will pass outward, the impedance of the circuit I$_2'$ L C will be practically infinite and the transformer will take only normal exciting current. (In fact the exciting current may be made less than normal by a very small increase in the value of L.) The device is reversible and may be made to convert high potential direct current to low potential alternating current.

I do not wish to limit myself to the use of the constant potential transformer as it is well understood by those versed in the art that a practically similar electrical condition may be obtained by shunting the condenser C about the terminals of a transformer having appreciable magnetic leakage and omitting the inductance L, as shown in Fig. 4. If the condenser C is then adjusted to the proper value, the exciting current at the no-load condition will have a minimum value which may be made as small as desirable by keeping the resistance of the transformer windings low.

Although for the purpose of more fully disclosing my invention I have described with some particularity several arrangements of apparatus and circuits whereby my method may be accomplished, it will be understood that my method is not limited to the specific embodiments of my invention herein described.

I claim:

1. An electrical conversion system having in combination an oscillation circuit, a source of electrical energy therefor, means creating electrical oscillations therein, a working circuit, and mechanically operated means periodically conveying the energy of said oscillations during a definite portion only of each cycle thereof from said oscillation circuit to said working circuit for obtaining a unidirectional current in said working circuit.

2. Means for obtaining a unidirectional current in a working circuit which consist of the combination of an oscillation circuit, a source of electrical energy therefor, means creating electrical oscillations therein, a working circuit, means for conveying the energy of said oscillations from said oscillation circuit to said working circuit and mechanically operated means disconnecting the oscillation circuit from the working circuit at the instant when the current at the point of disconnection is substantially at a minimum.

3. Means for obtaining a unidirectional current in a working circuit which consists in the combination of an oscillation circuit, a source of electrical energy therefor, means creating electrical oscillations therein, a working circuit, and mechanically operated means periodically connecting said oscillation circuit with said working circuit at the times when the energy in said oscillation circuit is substantially all in static form.

4. An electrical conversion system having in combination an oscillation circuit, a source of electrical energy therefor, a second oscillation circuit, and mechanically operated means periodically connecting and disconnecting said oscillation circuits to and from one another whereby a unidirectional current in said second oscillation circuit is obtained.

5. An electrical conversion system having in combination a source of electrical energy, an oscillation circuit, means periodically connecting said circuit to said source, a second oscillation circuit, means periodically connecting said second oscillation circuit to the first oscillation circuit and mechanically operated means disconnecting the two oscillation circuits at the instant when the current at the point of disconnection is substantially at a minimum.

6. An electrical conversion system having in combination a source of electrical energy, an oscillation circuit, means connecting said source with said oscillation circuit, a second oscillation circuit, mechanically operated means disconnecting said first oscillation circuit from said source, and means connecting the said first oscillation circuit to said second oscillation circuit.

7. An electrical conversion system having in combination a source of electrical energy, an oscillation circuit, means connecting said source with said oscillation circuit, a second oscillation circuit, means disconnecting the first oscillation circuit from said source, and mechanically operated means connecting the first oscillation circuit to the second oscillation circuit for an interval of time equal approximately to one-half of the time period of the second oscillation circuit.

8. An electrical conversion system having in combination a source of electrical energy, an oscillation circuit, means connecting said source with said oscillation circuit, a second oscillation circuit, and mechanically operated means disconnecting said first oscillation circuit from said source for an interval of time equal approximately to one-half of the time period of said first oscillation circuit.

9. An electrical conversion system having in combination a source of electrical energy, an oscillation circuit, means connecting said source with said oscillation circuit, a second oscillation circuit, mechanically operated means disconnecting said first oscillation circuit from said source for an interval of time equal approximately to one-half of the time period of said first oscillation circuit, and mechanically operated means connecting said first oscillation circuit to the second oscillation circuit for an interval of time equal approximately to one-half of the time period of the second oscillation circuit.

10. An electrical conversion system having in combination a source of electrical energy, an oscillation circuit, means connecting said source with said oscillation circuit, a second oscillation circuit, means disconnecting said first oscillation circuit from said source, and means connecting the same to the said second oscillation circuit at an instant slightly less than one-quarter of the time period of the first oscillation circuit after the disconnection thereof from said source.

11. An electrical conversion system having in combination a source of electrical energy, an oscillation circuit, means connecting said source with said oscillation circuit, a second oscillation circuit, means disconnecting said first oscillation circuit from said source, and means re-connecting said first oscillation circuit to said source after an interval equal approximately to one-half of the time period of said first oscillation circuit, and means connecting the first oscillation circuit to said second oscillation circuit during said interval.

12. In an electrical conversion system, a plurality of inductance coils, a source of direct current, means connecting said coils to said source, means whereby the electrokinetic energy developed in said coils by said current is transformed into electrostatic energy, a storage condenser, and means whereby said electrostatic energy is transferred to said storage condenser.

13. In an electrical conversion system, a plurality of oscillation circuits each including a condenser and a coil, a source of direct current, means connecting said oscillation circuits to said source, means whereby said oscillation circuits are successively disconnected from said source, a storage condenser and means whereby said oscillation circuits are successively connected to said storage condenser after their disconnection from said source.

14. In an electrical conversion system, a plurality of oscillation circuits each including a condenser and a coil, a source of direct current, means connecting said oscillation circuits to said source, means whereby said oscillation circuits are successively disconnected from said source, a storage condenser, a coil connected in series therewith and means whereby said oscillation circuits are successively connected to the circuit which includes the last mentioned coil and said storage condenser after the disconnection of said oscillation circuits from said source.

15. In an electrical conversion system, a plurality of oscillation circuits each including a condenser and a coil, a source of direct current, means connecting said oscillation circuits to said source, means whereby said oscillation circuits are successively disconnected from said source for an interval of time equal approximately to one-half of the time period of said circuits, a storage condenser and means whereby said oscillation circuits are successively connected to said storage condenser at an instant slightly less than one-quarter of said time period after the disconnection of said circuits from said source.

16. In an electrical conversion system, a plurality of oscillation circuits each including a condenser and a coil, a source of direct current, means connecting said oscillation circuits to said source, means whereby said oscillation circuits are successively disconnected from said source for an interval of time equal approximately to one-half of the time period of said circuits; a storage condenser and a coil connected in series therewith, said storage condenser and coil constituting a second oscillation circuit; and means whereby said first mentioned oscillation circuits are successively connected to said second oscillation circuit at an instant equal approximately to one-quarter of said time period after the disconnection of said oscillation circuits from said source, the duration of the connection of each of said oscillation circuits to the second oscillation circuit being equal approximately to one-half of the time period of said second oscillation circuit.

17. In a power transmission system, an oscillation circuit, a source of electrical energy associated therewith for creating electrical oscillations therein, a line circuit and mechanically operated means for periodically conveying the energy of said oscillations during a definite portion only of each cycle thereof from said oscillation circuit to said line circuit for obtaining a unidirectional current in said line circuit.

18. In a power transmission system, an oscillation circuit, a source of electrical energy associated therewith for creating electrical oscillations therein, a line circuit and mechanically operated means for periodically connecting said oscillation circuit with said line circuit at the times when the energy in said oscillation circuit is substantially all in static form for obtaining a unidirectional current in said line circuit.

19. A power transmission system having means for obtaining a unidirectional current in a line circuit which consists of an oscillation circuit, a source of electrical energy therefor, means for creating electrical oscillation therein, a storage condenser, a line circuit electrically connected with said storage condenser, and means periodically conveying the energy of said oscillation circuit during a definite portion of each cycle thereof from said oscillation circuit to said storage condenser.

20. A power transmission system having means for obtaining a unidirectional current in a line circuit which consists of an oscillation circuit, a source of electrical enrgy therefor, means for creating electrical oscillation therein, a storage condenser, a line circuit electrically connected with said storage condenser, means periodically connecting said oscillation circuit to said storage condenser and mechanically operated means disconnecting the oscillation circuit from the storage condenser at an instant of time when the current in said oscillation circuit is substantially at a minimum.

21. A power transmission system having means for obtaining a unidirectional current in a line circuit which consists of an oscillation circuit, a source of electrical energy therefor, means creating electrical oscillation therein, a storage condenser, a line circuit electrically connected to said storage condenser and mechanically operated means periodically connecting said oscillation circuit with said storage condenser at the times when the energy in said oscillation circuit is substantially all in static form.

22. A power transmission system having in combination a plurality of inductance coils, a source of direct current, means connecting said coils to said source, means transforming the electro-kinetic energy developed in said coils by said current into electro-static energy, a line circuit, and mechanically operated means transferring said electro-static energy to said line circuit.

23. A power transmission system having in combination a plurality of inductance coils, a source of direct current, means connecting said coils to said source, means successively transforming the electro-kinetic energy developed in said coils by said current into electro-static energy, a storage condenser, means successively transferring said electro-static energy to said storage condenser, and a line circuit electrically connected to said storage condenser and arranged to receive unidirectional current therefrom.

24. In a power transmission system, a plurality of oscillation circuits each including a condenser and a coil, a source of direct current, means connecting said oscillation circuit to said source, means whereby said oscillation circuits are successively disconnected from said source, a storage condenser and means whereby said oscillation circuits are successively connected to said storage condenser after their disconnection from said source; a line circuit connected to said storage condenser, a second storage condenser at a receiving station at the other terminal of said line circuit; a plurality of oscillation circuits at said receiving station each including a condenser and a coil, means successively connecting said storage condenser with said oscillation circuits at said receiving station, a power consuming device, and means whereby said oscillation circuits at said receiving station are successively connected to said power consuming device after their disconnection from said second storage condenser.

25. An electrical conversion system having in combination a source of electrical energy, a condenser, means periodically establishing a charge of electrical energy in said condenser from said source, an inductance, a second condenser, a circuit serially connecting said condensers and inductance, and mechanically operated devices opening and closing said circuit at intervals of time coincident with the natural half-oscillation period; of said circuit whereby electrical energy is transferred from one condenser to the other.

26. An electrical conversion system having in combination a source of electrical energy, a condenser, means periodically establishing a charge of electrical energy in said condenser from said source, an inductance, a second condenser, a circuit serially connecting said condensers and inductance, and means closing and opening said circuit for an interval equal approximately to one-half of the time period of the circuit which includes said condensers and inductance whereby energy is periodically conveyed from one condenser to the other.

27. In an electrical conversion system, a circuit, a condenser connected in said circuit, a source of electrical energy, means periodically connecting said circuit to said source for creating vibratory current therein, a working circuit, and means for periodically conveying the energy of said vibratory current during a definite portion of each cycle thereof from the first mentioned circuit to said working circuit for obtaining a unidirectional current in said working circuit.

28. In an electrical conversion system, a circuit, a condenser connected in said circuit, means for creating a periodic vibratory current in said circuit, an oscillation circuit, a working circuit associated with said oscillation circuit, and means for periodically conveying a portion of the energy of said vibratory current during a definite portion of each cycle thereof from the first mentioned circuit to said oscillation circuit for obtaining a unidirectional current in said working circuit.

29. In an electrical conversion system, a circuit, a condenser connected in said circuit, means for creating a periodic vibratory current in said circuit, an oscillation circuit, a working circuit associated with said oscillation circuit, and means for periodically conveying the energy of said vibratory current from the first mentioned circuit to said oscillation circuit during approximately one-half of the time period of the latter for obtaining a unidirectional current in said working circuit.

30. In an electric conversion system, an inductance, a condenser in shunt thereto, said inductance and condenser constituting an oscillation circuit, electrical means for causing said circuit to execute natural oscillations, a working circuit, and mechanically-operated means for connecting said working circuit to said oscillation circuit throughout a definite portion of the half cycle of said oscillation circuit, whereby a unidirectional current is obtained in said working circuit.

31. In an electric conversion system, a source of electrical energy, a condenser, means causing said source to periodically establish a charge in said condenser, a second condenser, a circuit serially connecting said condensers, an inductance in said circuit, the said circuit including said condensers and inductance constituting an oscillation circuit, and means for closing said circuit during one-half of the natural period of said oscillation circuit and then opening the same, whereby a maximum amount of energy is transferred from one condenser to the other.

32. An electric conversion system having in combination a circuit including a condenser, a source of low potential energy therefor, means creating vibratory current therein, a working circuit, means periodically conveying the energy of said vibratory current during a definite portion of each cycle thereof from the first circuit to said working circuit for obtaining a high potential unidirectional current in said working circuit, and means for converting said high potential unidirectional current into low potential electrical energy.

33. An electric conversion system having in combination a circuit including a condenser, means creating a periodic vibratory current therein, an oscillation circuit, a working circuit associated with said oscillation circuit, means periodically conveying a portion of the energy of said vibratory current during a definite portion of each cycle thereof from the first mentioned circuit to said oscillation circuit for obtaining a high potential unidirectional current in said working circuit and means for converting said high potential unidirectional current into low potential electrical energy.

34. An electric conversion system having in combination a circuit including a condenser, means creating a periodic vibratory current therein, an oscillation circuit, a working circuit associated with said oscillation circuit, means periodically conveying the energy of said vibratory current from the first mentioned circuit to said oscillation circuit during approximately one-half of the time period of the latter for obtaining a high potential unidirectional current in said working circuit, and means converting said high potential unidirectional current into low potential electrical energy.

35. An electrical conversion system having in combination means starting oscillations in a circuit, said circuit, and mechanically operated means breaking said circuit at the instant when the current in said oscillation circuit is substantially at a minimum.

36. An electrical conversion system having in combination mechanically operated means starting oscillations in a circuit, said circuit, and mechanically operated means breaking said circuit at the instant when the current in said oscillation circuit is substantially at a minimum.

37. An electrical conversion system having in combination a circuit including an inductance, means starting oscillations in said circuit, and mechanically operated means breaking said circuit at the instant when the current in said oscillation circuit is substantially at a minimum.

38. An electrical conversion system having in combination a circuit, means starting oscillations in said circuit, and a mechanically operated switch breaking said circuit at the end of each half oscillation.

39. An electrical conversion system having in combination a source of electrical energy, an oscillation circuit, means periodically connecting said oscillation circuit to said source whereby oscillations are started in the said circuit, a second oscillation circuit, means periodically connecting said second oscillation circuit to the first oscillation circuit, and mechanically operated means breaking said second oscillation circuit at the instant when the current therein is at a minimum.

40. An electrical conversion system having in combination, a condenser, means periodically establishing a charge of electrical energy in said condenser, an inductance, a second condenser, a circuit serially connecting said condensers and inductance, and mechanically-operated devices opening and closing said circuit at intervals of time coincident with the natural half-oscillation period of said circuit whereby electrical energy is transferred from one condenser to the other.

41. An electrical conversion system having in combination, a condenser, means periodically establishing a charge of electrical energy in said condenser, an inductance, a second condenser, a circuit serially connecting said condensers and inductance, and means closing and opening said circuit for an interval equal approximately to one-half of the time period of the circuit which includes said condensers and inductance whereby energy is periodically conveyed from one condenser to the other.

In testimony whereof, I have hereunto subscribed my name this 3rd day of Dec. 1909.

SEWALL CABOT.

Witnesses:
E. B. TOMLINSON,
GEO. K. WOODWORTH.